US005988442A

United States Patent [19]

Corey et al.

[11] Patent Number: 5,988,442

[45] Date of Patent: Nov. 23, 1999

[54] CUSTOMIZED REUSABLE FLOW-THROUGH TOOTHPASTE TUBE ATTACHMENT

[76] Inventors: Richard W. Corey, 5829 Devon Dr., Rocklin, Calif. 95765; Angela Vasconcellos, 1492 Quail Cir., Roseville, Calif. 95661

[21] Appl. No.: 08/890,642

[22] Filed: Jul. 9, 1997

[51] Int. Cl.[6] .................................................... B65D 35/00

[52] U.S. Cl. ................................................ 222/78; 222/92

[58] Field of Search ................................ 222/78, 92, 107

[56] References Cited

U.S. PATENT DOCUMENTS

| | | | |
|---|---|---|---|
| 1,637,667 | 8/1927 | Vaughan | 222/78 |
| 3,178,060 | 4/1965 | Bossack | 222/78 |
| 3,797,711 | 3/1974 | Bowerman | 222/219 |
| 4,974,748 | 12/1990 | Rae | 222/1 |
| 5,297,980 | 3/1994 | Barthold | 222/78 |
| 5,738,232 | 4/1998 | Roberts et al. | 222/78 |

FOREIGN PATENT DOCUMENTS

| | | | |
|---|---|---|---|
| 287269 | 3/1928 | United Kingdom | 222/78 |

*Primary Examiner*—Joseph A. Kaufman

[57] ABSTRACT

Customized, Reusable Flow-Through Toothpaste Tube Attachment: a plastic or similar material (20) consisting of a threaded entrance orifice (23) which can be affixed to the threaded neck of a toothpaste tube (15) forming a seal. The threaded entrance orifice (23) is in communication with a continuous passage (30) which leads to an exit orifice (35). Once the attachment forms a seal with the threaded neck of a toothpaste tube (15), toothpaste can be forced through the passage (30) and out through an exit orifice (35) by squeezing the toothpaste tube. As toothpaste flows out of the exit orifice (35) of the attachment, it can be applied to the bristles of a toothbrush or the like. The reusable attachment (20) provides the flexibility to customize the exit orifice of a toothpaste tube as well as the angle at which toothpaste exits the tube. As such, this invention is particularly beneficial to children as well as others that do not have sufficient coordination or muscle control to successfully apply the appropriate amount of toothpaste to their toothbrush.

3 Claims, 1 Drawing Sheet

CUSTOMIZED REUSABLE FLOW-THROUGH TOOTHPASTE TUBE ATTACHMENT

BACKGROUND

1. Field of Invention

This invention relates to toothpaste tube attachments, specifically reusable flow-through attachments.

BACKGROUND

2. Description of the Prior Art

Below is a description of some of the limitations associated with toothpaste tubes. Though such tubes do not represent prior art with respect to toothpaste tube attachments, a discussion of their limitations is essential for introducing the problems that this invention addresses.

Toothpaste is most commonly packaged in flexible tubes with threaded caps. After removal of the cap, which is typically screwed on to the tube, the tube can be squeezed to force toothpaste through the opening. Thus, toothpaste is applied to the toothbrush at the same time that the user is squeezing the tube.

Toothpaste tubes are manufactured in a limited number of sizes, shapes, and styles. To date, toothpaste tubes have not been customized to the individual needs of users. Limitations of toothpaste tubes include, but are not limited to, the size of the exit orifice as well as the angle at which the toothpaste exits the tube. Because of these limitations, some people, particularly children, have a difficult time applying toothpaste from toothpaste tubes. Specifically, the limitations of toothpaste tubes include:

(a) the exit orifice of the toothpaste tube cannot be adjusted. As such, children, particularly children which have not developed sufficient muscle control, deposit excessive amounts of toothpaste on to the toothbrush or surrounding surfaces such as the sink. In addition to leaving a mess, the over-application of fluoridated toothpaste to the toothbrush can present risks to children. In fact, because of the potential health risks, toothpaste tube labels commonly include warnings against the excessive consumption of fluoridated toothpaste by children.

(b) the angle at which toothpaste is expelled from the tube cannot be adjusted. As such, children have a difficult time aligning the bristles of the toothbrush with the exit orifice of the toothpaste tube. In fact, children commonly need to tilt the toothbrush bristles into a position other than vertical to apply toothpaste from a tube. However, the resulting positioning increases the likelihood that more toothpaste will end up in the sink rather than on the toothbrush.

(c) toothpaste tube caps, which are typically screwed on to the tube, are difficult for children to remove and, once removed, are easily lost. Even if not lost, the caps are commonly left off of the toothpaste tube because of the difficulty children have with their removal.

Currently, there are no reusable flow-through toothpaste tube attachments which address the problems we have identified. However, U.S. Pat. No. 3,797,711 to Bowerman (1974) proposed a device which can be attached to a toothpaste tube. The device provides for the dispensing of a metered amount of toothpaste. The device suffers in that it consists of moving parts which require manipulation which is too cumbersome for children. Furthermore, the device suffers in that the amount of toothpaste dispensed cannot be adjusted to meet the needs of the user. Finally, the device does not alter the angle at which toothpaste is dispensed thus making it difficult for children to align the toothbrush bristles with the dispensing orifice of the device.

OBJECTS AND ADVANTAGES

Accordingly, several objects and advantages of our invention are:

a) to provide the flexibility to customize the exit orifice of a toothpaste tube to meet the needs of the user without changing the toothpaste tube itself;

b) to provide the flexibility to customize the angle at which toothpaste is dispensed from a toothpaste tube to meet the needs of the user without changing the toothpaste tube itself;

c) to provide a toothpaste tube attachment which can be produced in a variety of colors, sizes, and forms such that a toothpaste tube can be aesthetically customized to reflect the interests of the user thus helping to encourage people, especially children, to brush their teeth, d) to provide a toothpaste tube attachment which can be easily attached as well as removed from a toothpaste tube;

e) to provide a toothpaste tube attachment which is easy to use in that it does not rely on any moving parts or special training to operate which is particularly important with respect to children;

f) to provide a toothpaste tube attachment which is inexpensive to manufacture and can be reused;

g) to provide an attachment that reduces the over application of toothpaste on to the toothbrush and or surrounding surfaces, and h) to provide a toothpaste tube attachment that can obviate the need for the, difficult to use cap, which comes with the toothpaste tube.

Further objects and advantages are to provide a toothpaste tube attachment that could be distributed in existing toothpaste tube packaging thus minimizing additional costs to bring to market. Still further objects and advantages will become apparent from a consideration of the ensuing description and drawings.

DRAWING FIGURES

REFERENCE NUMERALS IN DRAWINGS

Toothpaste tube 10

Threaded neck of toothpaste tube 15

Toothpaste tube attachment 20

Entrance to threaded orifice 23

Threaded orifice 25

Passage 30

Exit orifice 35

DESCRIPTIONS OF FIGS. 1 TO 5

Figure 1:
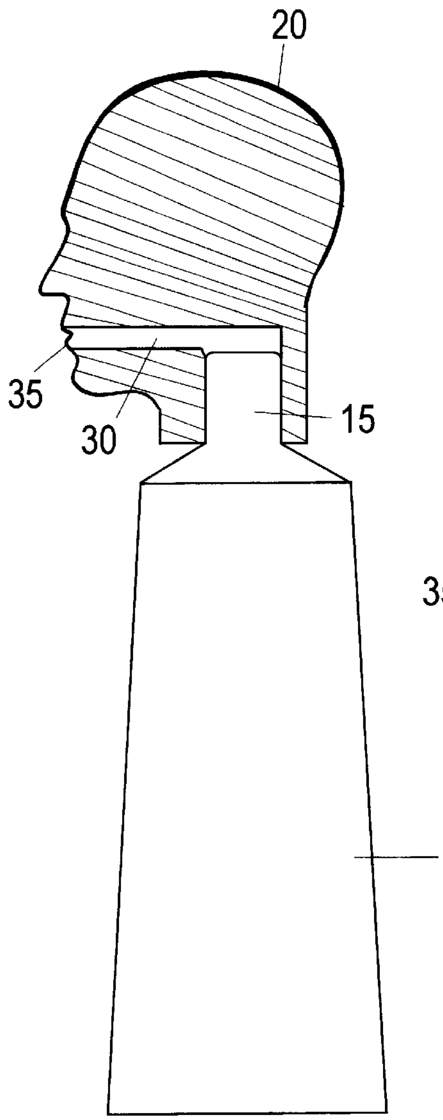
FIG. 1 shows a sectional side view of a toothpaste tube attachment affixed to a toothpaste tube.
Figure 2:
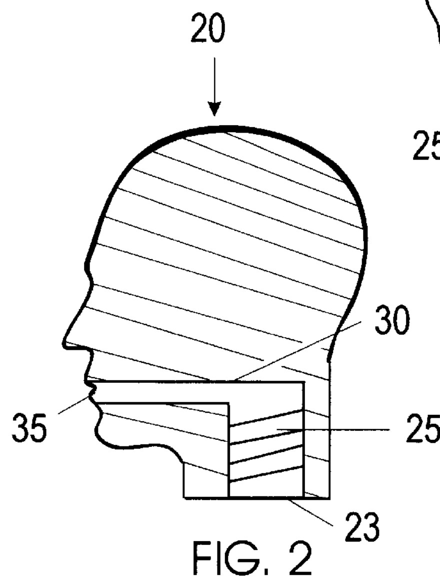
FIG. 2 shows a sectional side view of a toothpaste tube attachment.
Figure 3:
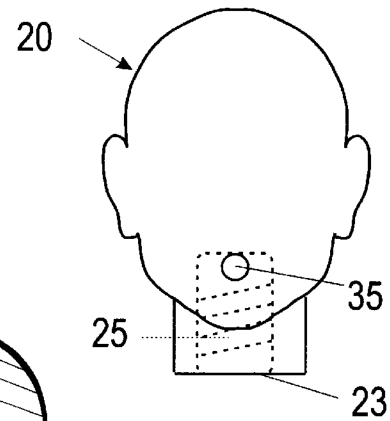
FIG. 3 shows a frontal view of a toothpaste tube attachment.
Figure 4:
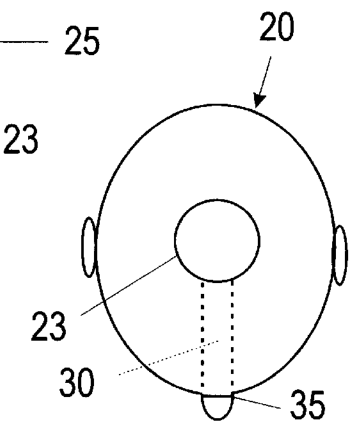
FIG. 4 shows a bottom view of a toothpaste tube attachment.
Figure 5:
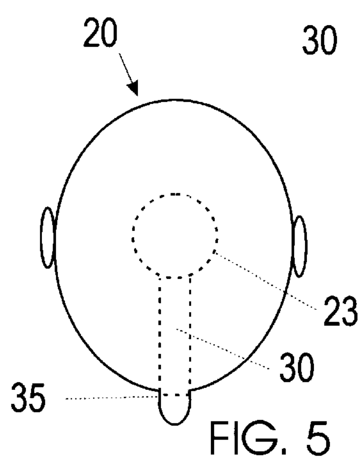
FIG. 5 shows a top view of a toothpaste tube attachment.

An embodiment of a toothpaste tube attachment (20) is illustrated in FIGS. 1 to 5. The invention consists of the toothpaste tube attachment (20) with an entrance to the threaded orifice (23) and the the threaded orifice (25). A continuous passage (30) runs from the entrance to the threaded orifice (23) to the exit orifice (35). The entrance to the threaded orifice (23) and the threaded orifice (25) are sized such that a seal with the threaded neck of the toothpaste tube (15) is formed when the toothpaste tube attachment (20) is screwed on to the threaded neck of the toothpaste tube (15).

In the preferred embodiment, the toothpaste tube attachment (20) is a plastic material. However, the attachment can consist of any other material which is rigid enough to support the passage (30) and can be threaded such that it will form a seal with the threaded neck of the toothpaste tube (15).

From the previous description, a number of advantages of our reusable toothpaste tube attachment become evident including:

(a) The ease with which it can be affixed to a toothpaste tube (10) and immediately used without any instruction.

(b) The simplicity of design and lack of any mechanical parts helps to increase its reliability and useful lifetime.

(c) The multitude of embodiments that can be produced by modifying the size and shape of the toothpaste tube attachment (20), the passage (30), and/or the exit orifice (35).

(d) The multitude of embodiments that can be produced by modifying the length and shape of the passage (30).

Operation-FIG. 1

Once the threaded orifice (25) is affixed to the threaded neck of the toothpaste tube (15), the toothpaste tube attachment's (20) operation is identical to that of a toothpaste tube. Specifically, as the toothpaste tube (10) is squeezed, toothpaste is forced out of the toothpaste tube (10), through the attachment's passage (30) out through the exit orifice (35) and on to the toothbrush bristles (not shown) or the like.

Because the size and shape of the passage (30) and exit orifice (35) can be different from that of the orifice of the threaded neck of the toothpaste tube (15), the attachment can be customized to meet the needs of the user. For example, the attachment can be produced so that less toothpaste is extruded when the toothpaste tube (10) is squeezed than would have been extruded without the attachment. This feature is highly desirable when considering individuals, particularly children, that do not have sufficient muscle control to regulate the flow of toothpaste out of a toothpaste tube (10) not utilizing our invention.

In addition, as illustrated in FIG. 1, the toothpaste tube attachment (20) can be used to change the angle at which toothpaste (not shown) is dispensed from the toothpaste tube (10) so that it can be customized to meet the needs of the user. This feature is also highly desirable when considering individuals, particularly children, that may not have sufficient coordination to align the threaded neck of a toothpaste tube (15) with the bristles of a toothbrush (not shown) or the like.

SUMMARY, RAMIFICATIONS, AND SCOPE

Accordingly, the reader will see that the toothpaste tube attachment of this invention provides a means to customize toothpaste tubes to meet the needs of the user. More specifically, this invention provides the flexibility to customize the exit orifice of the toothpaste tube as well as the angle at which toothpaste exits the tube. As such, this invention is particularly beneficial to children who generally do not have sufficient coordination or muscle control to successful apply the appropriate amount of toothpaste to their toothbrush. Furthermore, the toothpaste tube attachment of this invention has additional advantages including:

- to provide the flexibility to customize the exit orifice of a toothpaste tube to meet the needs of the user without changing the toothpaste tube itself;
- to provide the flexibility to customize the angle at which toothpaste is dispensed from a toothpaste tube to meet the needs of the user without changing the toothpaste tube itself;
- to provide an attachment that can be produced in a multitude of forms such as animals, sports equipment, cartoon characters, etc. thus allowing toothpaste tubes to be customized to match the interests of the user. This feature will help to encourage children as well as others to brush;
- to provide a toothpaste tube attachment which is easy to use in that it does not rely on any moving parts or special training to operate which is particularly important with respect to children as well as some adults;
- to provide an attachment that reduces excessive waste of toothpaste that is otherwise applied to the toothbrush or misses it altogether;
- to provide a toothpaste tube attachment which can be easily attached as well as removed from a toothpaste tube; and
- to provide a toothpaste tube attachment which is inexpensive to manufacture and can be reused.

Although the description above contains many specifications, these should not be construed as limiting the scope of the invention but as merely providing illustrations of some of the presently preferred embodiments of this invention. For example the toothpaste tube attachment can have other shapes, colors, and sizes. Furthermore, the size and shape of the passage, entrance and exit orifices can vary. For example, the exit orifice can have other shapes such as circular, half circular, rectangular, or triangular. As another example, the size of the threaded orifice including its type of threads can vary in order to accommodate the different threaded necks that are associated with toothpaste tubes. Still another example concerns the extent, if any, that the attachment changes the angle with which toothpaste is dispensed from the toothpaste tube. Specifically, the attachment may change the angle at which toothpaste is dispensed from the toothpaste tube by any number of angles including, but not limited to, 0 degrees, 90 degrees, etc. As another example, the toothpaste tube attachment may include a cap such as a screw-on or push-in cap.

Thus, the scope of the invention should be determined by the appended claims and their legal equivalents, rather by the examples given.

What we claim is:

1. A reusable toothpaste tube attachment comprising:

a) a plastic member in the shape of a character including a threaded orifice that can be affixed to a threaded neck of a collapsible toothpaste tube forming a seal b) said member surrounding a continuous passage from said threaded orifice to an exit orifice substantially near the member's surface c) said exit orifice having a cross section where its width is greater than its height d) said exit orifice of said toothpaste tube attachment is angled about 45 to 135 degrees relative to said threaded neck of said collapsible toothpaste tube e) whereby, toothpaste can flow from said collapsible toothpaste tube through said passage to said exit orifice when said collapsible toothpaste tube is squeezed allowing toothpaste to be easily and simply applied to a toothbrush.

2. The reuseable toothpaste tube attachment as defined in claim 1 wherein the cross section of the exit orifice is symmetrical in shape.

3. The reuseable toothpaste tube attachment as defined in claim 1 wherein the cross section of the exit orifice is asymmetrical in shape.

* * * * *